Patented Aug. 17, 1937

2,090,104

UNITED STATES PATENT OFFICE 2,090,104

ABRASIVE TOOL

Orello S. Buckner, Northboro, Mass.

No Drawing. Application September 2, 1936,
Serial No. 99,091

8 Claims. (Cl. 51—280)

This invention relates to abrasive articles and more particularly to grinding wheels having abrasive grains bonded together by means of gum shellac.

Shellac bonded grinding wheels, as for instance, steel centered coping wheels and saw gumming wheels, are generally made from abrasive grains of crystalline alumina, or carbide of silicon, united together into an integral, suitably shaped mass by a bond of shellac, or shellac and a mineral filler like pulverized clay, the bond having been hardened by a heat treatment at a temperature or about 340° F.

The shellac, which is preferably a purified gum shellac obtained from India, is sometimes blended with substances other than mineral fillers to change its characteristics somewhat. Thus a mixture of 90% shellac, 8% sulphur and 2% pine rosin has been considered somewhat higher in tensile strength than shellac alone, and has been used extensively in producing shellac bonded wheels.

Although wheels made of these bonds have been found to be fairly satisfactory, shellac bonded wheels, in general, have, in many instances, failed to give satisfactory service, because the frictional heat of grinding tends to soften the shellac, resulting in rapid loss of strength and rapid wheel wear. Further, shellac bonded wheels have been limited to wheels of soft and medium hardnesses, mostly because of the limited strength of shellac and shellac, rosin, and sulphur mixtures.

The objects of my invention are to produce a shellac composition which becomes vulcanized when heat treated and forms a compound that has a greatly increased tensile strength and which does not appreciably soften when heated, thereby to produce a shellac bonded grinding wheel which has substantially increased tensile strength, improved heat resisting qualities, and better grinding efficiency.

I accomplish these objects by producing the composition of matter, and the products made therefrom, as set forth in the following specification, and covered by the claims appended hereto.

As a result of many tests and experiments I have discovered that shellac, preferably gum shellac which is rosin free, when mixed with the proper proportions of an activator, such as zinc oxide, and sulphur, can be vulcanized in a similar manner to that in which rubber may be vulcanized, and results in a composition of greatly increased tensile strength and heat resisting qualities, in that heat at normal grinding temperatures does not soften the compositions thus produced, to an appreciable extent, and at the same time, when used as a bond for a grinding wheel, is advantageous in that a smaller proportion of bonding material is required, as compared with standard formulas, to produce a grinding wheel of equal hardness, and its use for this purpose results in the production of a grinding body which effectively resists the frictional heat of grinding and is much more enduring and efficient as a grinding and cutting tool.

I have further discovered that if a suitable accelerator such as mercaptobenzothiazole, which is sold under the trade name of "Captax" is added to the mixture of shellac, zinc oxide, and sulphur, in a proper proportion of these substances, the chemical union thereof is greatly facilitated and the advantageous properties of the vulcanized compound are substantially increased.

In accordance with my invention I form an abrasive article, such as a grinding wheel, by uniting together grains of abrasive material, such as crystalline alumina or silicon carbide grains, with a vulcanizable shellac compound composed of gum shellac, an activator, or catalyst, such as zinc oxide, sulphur, and an accelerator, such as "Captax".

In practice I may employ either of the two following methods of mixing this shellac compound with the abrasive grains.

The first method consists in mixing the shellac, zinc oxide, sulphur and "Captax" in pulverized form and in the correct proportions. The desired amount of abrasive grains are then placed in a mixing machine having a bowl which is electrically heated. When the grains are heated to about 300° F. the mixture of shellac, zinc oxide, sulphur and "Captax" are added at one time. The shellac and sulphur at once melt and the mixing blades of the machine quickly cause the abrasive grains to become coated with the compound. The grains are then removed from the machine, cooled, and restored to granular form by pressure. They are then placed in a steel mold and compressed into any desired shape, such as a grinding wheel, by application of both pressure and heat in accordance with any accepted practice in the art. The vulcanization process is then performed by heat treatment in the usual manner.

The second method consists in mixing the shellac, zinc oxide and sulphur, in the correct proportions, then heating the mixture to the melting point of the shellac and sulphur and stirring to form a homogeneous mixture, then cooling and grinding to a powder in a pebble mill, or by other suitable means, then adding the "Captax" powder, then coating the abrasive grains with a shellac solvent, as butyl cellosolve, then adding a suitable quantity of the dry pulverized compound of shellac, zinc oxide, sulphur and "Captax" to the solvent coated grains and stirring until the grains become thoroughly coated with the compound, and then pressing the grains thus coated into a suitable mold of the desired shape, after which the mass will be vulcanized.

As a specific example of a grinding wheel composition made in accordance with this invention I may use the following proportions of shellac, zinc oxide, sulphur, accelerator and abrasive grains.

| | Percent |
|---|---|
| Abrasive grains of desired size | 80 |
| Gum shellac | 13 |
| Zinc oxide | 5 |
| Sulphur | 1.6 |
| Mercaptobenzothiazole ("Captax") | .04 |

Not only may the percentage of abrasive grains be varied from 50% to 95% depending upon the hardness and toughness of the abrasive article desired but the relationship of the gum shellac, zinc oxide, sulphur, and "Captax" may be varied within the following limits and still retain the beneficial properties of this compound.

| | Percent |
|---|---|
| Gum shellac | 40 to 94 |
| Zinc oxide | 5 to 40 |
| Sulphur | 1 to 20 |
| Mercaptobenzothiazole | .01 to 3 |

Tests and experiments prove that when gum shellac, zinc oxide, sulphur and "Captax" are mixed together in approximately the proportions above stated, and are vulcanized at a temperature of approximately 340° F., a chemical reaction takes place which changes the character of the shellac rendering it non-softening when subjected to heat, and of greatly increased tensile strength. In combining this compound with abrasive grains I have provided a bond which can be readily mixed with abrasive grains, and molded into any desired shape, and then vulcanized, and which has a much higher tensile strength and greater resistance to the heat of grinding than gum shellac bonds which have previously been employed.

In accordance with this invention I have provided an abrasive article which is fast cutting and has a longer life and a higher grinding quality than previously produced shellac bonded tools, i. e. the ratio between the rate of material removed and rate of wheel wear is higher than is attained by articles made of standard shellac bonds, such as shellac alone or mixtures of shellac, sulphur or rosin or both, either with or without a mineral filler like powdered clay. It has been found by tests that a wheel bonded with vulcanized shellac as above described, shows less wear and a larger weight of material removed than the previously produced shellac bonded tools, this being largely due to the greatly increased resistance of the bond to the fricional heat of grinding.

While my tests have not been extended beyond the use of zinc oxide and "Captax", it is my belief that equivalent results may be secured by substituting magnesium oxide, iron oxide, lime, or similar activators for the zinc oxide and that organic accelerators other than "Captax", or inorganic accelerators may be advantageously employed.

I claim:

1. An abrasive wheel comprising a body of abrasive grains united by a heat vulcanized bond of shellac, in which sulphur and an activator have been intimately mixed.

2. An abrasive wheel comprising a body of abrasive grains united by a heat vulcanized bond of shellac, in which sulphur, an activator, and an accelerator have been intimately mixed.

3. An abrasive wheel comprising a body of abrasive grains united by a bond of shellac mixed with sulphur and a metallic oxide and which has been vulcanized to hardness by heat treatment.

4. An abrasive wheel comprising a body of abrasive grains united by a bond of shellac mixed with sulphur and zinc oxide and which has been vulcanized to hardness by heat treatment.

5. An abrasive wheel comprising a body of abrasive grains united by a bond of shellac mixed with sulphur, an oxide and an accelerator and which has been vulcanized to hardness by heat treatment.

6. An abrasive wheel comprising a body of abrasive grains united by a bond of shellac mixed with sulphur, zinc oxide and mercaptobenzothiazole and which has been vulcanized to hardness by heat treatment.

7. An abrasive wheel comprising a body of abrasive grains united by a heat vulcanized bond of shellac, homogeneously mixed with sulphur and an activator, which has been incorporated directly in the bond in such an amount as to increase the heat resistance of the shellac, so that it will not become appreciably softened at normal grinding temperatures.

8. An abrasive wheel comprising a body of abrasive grains united by a heat vulcanized bond of shellac, homogeneously mixed with sulphur, an activator and an accelerator, which have been incorporated directly in the bond in an amount sufficient to increase the heat resistance of the shellac, so that it will not become appreciably softened at normal grinding temperatures.

ORELLO S. BUCKNER.